US005511121A

United States Patent [19]
Yacobi

[11] Patent Number: 5,511,121
[45] Date of Patent: Apr. 23, 1996

[54] EFFICIENT ELECTRONIC MONEY

[75] Inventor: Yacov Yacobi, Berkeley Heights, N.J.

[73] Assignee: Bell Communications Research, Inc., Morristown, N.J.

[21] Appl. No.: 303,048

[22] Filed: Sep. 8, 1994

Related U.S. Application Data

[63] Continuation-in-part of Ser. No. 201,106, Feb. 23, 1994.
[51] Int. Cl.$^6$ ........................................ H04K 1/00
[52] U.S. Cl. ........................ 380/24; 380/23; 380/30
[58] Field of Search ........................ 380/23, 24, 25, 380/28, 30

[56] References Cited

U.S. PATENT DOCUMENTS

| | | | |
|---|---|---|---|
| 4,977,595 | 12/1990 | Ohta et al. | 380/24 |
| 5,199,070 | 3/1993 | Matsuzaki et al. | 380/30 |
| 5,222,140 | 6/1993 | Beller et al. | 380/30 |
| 5,224,162 | 6/1993 | Okamoto et al. | 380/24 |
| 5,299,263 | 3/1994 | Beller et al. | 380/30 |

FOREIGN PATENT DOCUMENTS

| | | | |
|---|---|---|---|
| 0139313 | 5/1985 | European Pat. Off. | 380/24 |
| 0348812 | 6/1989 | European Pat. Off. | 380/24 |

OTHER PUBLICATIONS

W. Diffie et al., "New Directions in Cryptography", IEEE Transactions on Information Theory, 1976, vol. IT–22, pp. 644–654.

R. L. Rivest et al., "A Method for Obtaining Digital Signatures and Public-Key Cryptosystems," Communications of the ACM, 1978, vol. 21, pp. 120–126.

D. Chaum et al., "Untraceable Electronic Cash", Proceedings of Crypto 1988, pp. 1–8.

D. Chaum, "Achieving Electronic Privacy," 1992, Scientific American, pp. 96–101.

S. Brands, "Electronic Cash Systems Based On The Representation Problem in Groups of Prime Order," Proceedings of Crypto '93, Santa Barbara, CA., pp. 26.1–26.15.

S. Evan et al., "Electronic Wallet," Proceedings of the 1984 International Zurich seminar on Digital Communications, Santa Barabara, CA, pp. K 3.1–K 3.2.

T. Elgamal, "A Public Key Cryptosystem and a Signature Scheme Based on Discrete Logarithms," IEEE Transactions on Information Theory, 1985, vol. IT–31, pp. 469–472.

O. Goldreich et al., "Proofs that Yield Nothing But Their Validity or All Languages in NP Have Zero–Knowledge Proof Systems," Journal of the Association for Computing Machinery, 1991, vol. 38, pp. 691–729.

S. Goldwasser et al., "The Knowledge Complexity of Interactive Proof Systems," SIAM Journal on Computing, 1989, vol. 18, pp. 186–208.

E. F. Brickell et al. "Gradual and Verifiable Release of a Secret," Proc. Crypto '87, pp. 156–166.

M. O. Rabin, "Digitalized Signatures and Public–Key Functions as Intractable as Factorization," MIT Laboratory For Computer Science, Jan. 1979, pp. 1–16.

Primary Examiner—David C. Cain
Attorney, Agent, or Firm—Leonard Charles Suchyta; James W. Falk

[57] ABSTRACT

A unique electronic cash system protects the privacy of users in legitimate transactions while at the same time enabling the detection of a double spender of the same electronic coin. The electronic cash system takes advantage of a unique property of El Gamal signatures to achieve these results.

51 Claims, 6 Drawing Sheets

FIG. 2

| PAYMENT | |
|---|---|
| PAYER-j | PAYEE-j |
| (1) $C \equiv (f(P_i, u, 0^\gamma))^{d_b} \bmod N_b$ → | |
| (2) | $C^{e_b} \equiv (f(P_i, u, 0^\gamma)) \bmod N_b$ (ABORT IF NOT) |
| (3) | PICK RANDOM m |
| (4) | ← (m) |
| (5) S = EL-GAMAL SIGNATURE OF m USING $(P_i, S_i, u)$ | |
| (6) (S) → | |
| (7) | VERIFY $(S, m, P_i)$ ABORT IF NEGATIVE ELSE, STORE $(C, S, m)$ |

FIG. 3

| DEPOSIT | |
|---|---|
| PAYEE-j | BANK |
| (1) COIN C EL-GAMAL SIGNATURE S MESSAGE m → | |
| (2) | BANK VERIFIES COIN BY VERIFYING $C^{e_b} \equiv (f(P_i, u, 0^\gamma)) \bmod N_b$ |
| (3) | BANK MAINTAINS A LIST OF DEPOSITED COINS, EL-GAMAL SIGNATURES, AND MESSAGES |
| (4) | COIN IN LIST? IF YES, ABORT AND COMPUTE PAYER'S IDENTITY ELSE, VERIFY PAYER'S SIGNATURE IF POSITIVE, ADD COIN C TO LIST |
| (5) | UPDATE j'S BALANCE |

FIG. 4

| EXCHANGE | |
|---|---|
| USER-j | BANK |
| (1) COIN C<br>EL-GAMAL SIGNATURE S ⟶<br>MESSAGE m | |
| (2) | VERIFY COIN |
| (3) | COIN IN LIST?<br>IF YES, ABORT AND<br>COMPUTE PAYER'S IDENTITY.<br>ELSE, VERIFY PAYER'S<br>SIGNATURE S.<br>IF POSITIVE, ADD COIN C<br>TO LIST. |
| (4) $CERT(i) \equiv (f(P_j, 0^\gamma) 0^{d_c} \bmod N_c$<br>$U \equiv a^r \bmod p$ ⟶ | |
| (5) | ⟵ NEW COIN $c' \equiv (f(P_j, u, 0^\gamma))^{d_b} \bmod N_b$ |

FIG. 5

| WITHDRAW | |
|---|---|
| USER-i | BANK |
| (1) $I_i$, ACCOUNT NO.<br>VALUE TO WITH WITHDRAWN ⟶ | |
| (2) | VERIFY ID,<br>CHECK BALANCE |
| (3) PICK RANDOM x<br>FORM BLIND CANDIDATE COIN<br>$\omega \equiv x^{eb}(f(p_i, u, 0^\gamma)) \bmod N_b$ ⟶ | |
| (4) PROVE $P_i$ IS PROPERLY FORMATTED. | |
| (5) | IF BANK REJECTS PROOF<br>THEN HALT. ELSE,<br>COMPUTE<br>$\omega^{d_b} \equiv x (f(P_i, u, 0^\gamma))^{d_b} \bmod N_b$ |
| (6) $C \equiv \omega^{d_b}/x \equiv (F(P_i, U, 0^\gamma))^{d_b} \bmod N_b$ | |

FIG. 6

| INITIAL CERTIFICATE | |
|---|---|
| USER-i | CERTIFICATION AUTHORITY |
| (1) PICK A RANDOM x <br> (2) COMPUTE $Z \equiv x^{e_c}(f(P_i, 0^\gamma)) \mod N_c$ ⟶ <br>   PROVE $P_i$ IS PROPER <br> (3) | <br><br> IF PROOF IS REJECTED <br> HALT OPERATION. <br> ELSE <br> ⟵ ($z^{d_c} \mod N_c$) |
| (4) CERT(i) $\equiv z^{d_c}/x \equiv (f(P_i, 0^\lambda))^{d_c} \mod N_c$ | |

FIG. 7

| REFRESH CERTIFICATE | |
|---|---|
| USER-i | CERTIFICATION AUTHORITY |
| (1) PICK RANDOM x    ⟶ VERIF. OLD CERT. <br> (2) OLD CERT(i) = $(f(P_i, 0^\gamma))^{d_c} \mod N_c$ <br> (3) BLIND NEW CANDIDATE CERTIFICATE <br>   $Y \equiv x^{e_c}(f(P'_i, 0^\gamma)) \mod N_c$ ⟶ <br>   PROVE TO CA THAT $P_i$ AND $P'_i$ <br>   HAVE THE SAME $I_i$ IN THE EXPONENTS. <br> (4) | <br><br><br><br><br><br> IF PROOF IS REJECTED <br> HALT OPERATION. <br> ELSE, COMPUTE <br> ⟵ ($Y^{d_c} \mod N_c$) |
| (5) $CERT_2(i) \equiv Y^{d_c}/x \equiv (f(P'_i, 0^\gamma))^{d_c} \mod N_c$ | |

FIG. 8

| C & C INITIAL CERTIFICATE ||
|---|---|
| USER-i | CERTIFICATION AUTHORITY |

PHASE I:
(1) USER-i AUTHENTICATES HERSELF, $(I_i)$ →

(2) $\{(B_{ij}^{(0)}, B_{ij}^{(1)}) \mid j=1\ldots k\}$ →

(3) ← $e = (e_1 \ldots e_k)$ (4) $\{(X_{ij}^{e_j}, R_{ij}^{e_j}) \mid j=1\ldots k\}$ →

(5) VERIFY:
$B_{ij}^{e_j} \equiv_{N_C} (X_{ij}^{(e_j)})^{e_c} \cdot f((\alpha^{S_{ij}})^{(e_j)}, L), \; j=1\ldots k$ (6) $B_i \equiv_{N_C} \Pi_{j=1}^{k} B_{ij}^{(\bar{e}_j)}$ (*)

(7) ← $C_i \equiv_{N_C} B_i^{d_c}$ (8) $D_i \equiv_{N_C} C_i \cdot (\Pi_{j=1}^{k} X_{ij})^{-1}$

PHASE II:
(9) MAKE ANONYMOUS CALL TO CA.

(10) $D_i, \{P_{ij}^{(\bar{e}_j)} \mid j=1\ldots k\}$ →

(11) VERIFY (PARTIAL) STRUCTURE AND SIGNATURE.

(12) FOR $j=1\ldots k$
PROVE THAT IN $S_{ij}^{(\bar{e}_j)}$
ALL THE I-FIELDS EXCEPT THE j'TH ARE ZEROES.

(13) ← VERIFY
$E_i \equiv_{N_C} (f((\Pi_{j=1}^{k} P_{ij}^{(\bar{e}_j)}) \bmod p), L)^{d_c}$

FIG. 9

| C & C REFRESH CERTIFICATE | |
|---|---|
| USER-i | CERTIFICATION AUTHORITY |
| (1) MAKE ANONYMOUS CALL TO CA (OLD $E_i'$, $\{P_{ij}' \mid j=1...k\}$) $\longrightarrow$ | |
| (2) | VERIFY (PARTIAL) STRUCTURE AND SIGNATURE. |
| (3) $\{B_{ij}^q \mid q=0,1; j=1...k\}$ $\longrightarrow$ | |
| (4) | $e \in_R \{0,1\}^k$ $\longleftarrow$ $e = (e_1...e_k)$ |
| (5) $\{(P_{ij}^{(e_j)} \equiv_\pi X_{ij}^{(e_j)}) \mid j=1...k\}$ $\longrightarrow$ | |
| (6) | VERIFY (PARTIAL) CONSISTENCY WITH $B_{ij}^{(e_j)}$, $j=1...k$ |
| (7) | BOTH COMPUTE $P_i' \equiv_p \prod_{j=1}^k P_{ij}'$ ; $P_i^{(e)} \equiv_p \prod_{j=1}^k P_{ij}^{(e_j)}$ ; $A \equiv_p P_i'/P_i^{(e)}$ |
| (8) PROVE THAT $A \equiv_p \alpha^\delta$, WHERE $\delta$ IS SHORT. | |
| (9) | PROCEED AS IN INIT. CERT FROM (*) |

EFFICIENT ELECTRONIC MONEY

RELATED APPLICATION

This is a continuation-in-part of U.S. patent application Ser. No. 08/201,106 filed on Feb. 23, 1994 for Y. Yacobi and assigned to the assignee hereof.

FIELD OF THE INVENTION

The present invention relates to electronic money, specifically, to a form of electronic money which is the electronic equivalent of cash or other currency. The invention provides a form of electronic money which deters double spending of a specific electronic coin, while at the same time protecting the privacy of payers (spenders) and payees (recipients) in cash transactions.

BACKGROUND OF THE INVENTION

Electronic money (e-money) comes in the same forms as ordinary money. For example, there are electronic equivalents of checks (e-checks) and electronic equivalents of cash (e-cash).

Electronic checks are easier to implement than electronic cash. In a paper check, the most important component is the user's signature. This signature is supposed to insure the correctness of an obligation to transfer a certain amount of money from the signer ("payer") to a specified payee. In addition, certain properties of the paper of which the check is made are designed so that changes to the content of the paper check will be noticeable. All of these properties are inherent to digital signatures (see e.g., W. Diffie, M. Hellman, "New Directions in Cryptography" IEEE Trans. IT. 1976 and R. Rivest, A. Shamir, and L. Adelman, "A Method for Obtaining Digital Signatures and Public Key Cryptosystems", CACM, vol. 21, 1978, pp. 120–126). Thus, it is straightforward to implement digital checks. Similarly, it is easy to implement digital credit cards. A digital signature in this case indicates the authenticity of the user and the user's consent to a particular transaction.

It is harder to create the digital equivalent of cash. (For a discussion of e-cash, see e.g., D. Chaum, et al. "Untraceable Electronic Cash", Proc. Crypto 1988, D. Chaum "Achieving Electronic Privacy" Scientific American, August 1992, pp 96–101, S. Brand "Electronic Cash Systems Based on the Representation Problem in Groups of Prime Order" Proceedings of Crypto '93 Santa Barbara 1993 pp 26–26.15; S. Even et al. "Electronic Wallet" Proc. Crypto '83). The main problem is this. Suppose that a bunch of digital bits represents a coin. What can prevent the payer from double spending the digital coin?

Two approaches have been used in the prior art to resolve this problem. Prevention and after the fact detection. For example, to prevent double spending, tamper resistant devices may be used. Such devices, called electronic wallets (e-wallets) or money modules, store a user's balance in a manner so that even the owner of the device cannot illegally modify the balance. A balance on one of these money modules can change if two such devices "agree" to a specified transaction, whereby one money module (the payer) agrees to pay X dollars to another money module (the payee). In this case, the balance in each money module is changed so that the sum of the two balances remains unchanged. A transaction between a bank and a user is similar except that it involves additional steps such as moving money from the user's checking account into the user's money module where the money now becomes e-cash. The use of tamper-resistant devices, i.e. money modules, to prevent the double spending of e-cash is preferred by banks because banks want to prevent double spending, not detect double spending after such double spending occurs.

However, it is impossible to create a 100% tamper proof money module type device. It is only a question of resources devoted to reverse engineering and decription, etc. If by gaining unauthorized access or "unwrapping" one money module one could forge ten million dollars, then it makes economic sense (but not moral sense) to invest one million dollars to penetrate the money module. There is a spectrum of tamper-resistant technologies that range in price and quality and some economic optimum must be reached.

This optimum is less expensive if a second line of defense can be added. Such a second line of defense might be the use of a process which provides for after the fact exposure of the double spender.

Another issue that arises in connection with the use of e-cash is privacy. For large transactions (e.g. buying a house), traceable forms of e-money such as e-checks can be used. Usually these kinds of transactions are not viewed as secret transactions and usually the parties want evidence as to these transactions. Electronic cash (e-cash) is generally used for smaller daily transactions (e.g. buying groceries and buying newspapers, etc.). A user would not want a government or large private agency a bank) to be able to constantly know his/her whereabouts and the details of daily purchases based on the payment of e-cash to various payees. Thus, after ordinary legitimate uses, the identity of an e-cash spender should not be traceable. On the other hand, the e-cash system should enable detection of the identity of a double spender of the same e-coin.

It is an object of the present invention to provide e-cash or e-coins with certain highly desirable characteristics. The characteristics include the following:

1. Once a bank detects double spending (i.e. the same e-coin is deposited twice), the bank should have enough information to efficiently expose the identity of the double spender. However, one legitimate deposit of a particular e-coin should not provide the bank with enough information to compute the identity of the person who paid the particular e-coin to the depositor.
2. The e-cash should be useable in the following transactions; (a) payment from payer to payee without revealing identity of payer, (b) deposit of money into the bank by the payee without revealing the identity of the payer, (c) an exchange transaction wherein a depositor gets a certain amount of fresh money from the bank in exchange for depositing the same amount of old money into the bank without revealing his/her identity, and (d) withdrawal from the bank.
3. The system should be efficient. Specifically, the system should require as few real time operations as possible during transactions, especially at the money modules used by individual users as the money modules have limited processing power. As many operations as possible should be done in advance of and apart from the transactions which take place in real time.

The present invention provides an e-cash system which has these advantages.

The e-cash system of the present invention relies on certain prior art techniques. These prior art techniques are described below:

A. Public Key Cryptography

In a typical public key cryptographic system, each party i has a public key $P_i$ and a secret key $S_i$. The public key $P_i$ is known to everyone, but the secret key $S_i$ is known only to party i. A clear text message m to user i is encrypted to form the cipher text message c using a public operation P which makes use of the public key $P_i$ known to everyone, i.e., $c=P(m,P_i)$. The cipher text message c is decrypted using a secret operation S which makes use of the secret key $S_i$, i.e., $m=S(c,S_i)$. Only the party i which has the secret key $S_i$ can perform the secret operation to decrypt the encrypted message.

Public key cryptographic techniques may also be used for authentication. If it is true that $P(S(m, S_i),P_i)=m$, then the owner of the corresponding keys $P_i$, $S_i$ could sign message m by producing $s=S(m,S_i)$, where s indicates the signature. The verifier, given m and s will verify $m=P(s,P_i)$. A signature system could be used for verification as follows: Challenge the party claiming to be i with message m and ask the party to sign the message m using his secret key $S_i$, then verify the signature using $P_i$.

An example of a public key cryptographic technique is the well known RSA technique. In accordance with this technique, a party i has a public key in the form of an exponent e and modulus N and a secret key in the form of an exponent d. Thus, a party with a message to send to party i encrypts the message m to form $c \equiv m^e$ mod N. The party i can then decrypt c to obtain m by performing the operation $m = c^d$ mod N.

Another public key crytographic technique is the Rabin modular square root. In this technique, the secret operation involves obtaining a modular square root and the public operation involves a modular squaring operation.

B. EL Gamal Signature Scheme

Let $P_i$ and $S_i$ be the public and secret keys of user i, where $P_i = \alpha^{S_i}$ mod p, where p is a large prime or a product of large primes, and $\alpha$ is a generator in $Z_p^*$. An El-Gamal signature by user i, on message m is an ordered pair $s=(u,v)$, for which $$P_i^u \cdot u^v \equiv \alpha^m \bmod p \quad (1)$$

Thus a recipient of a signature can easily verify it. To create a signature, user i chooses a random number r, and computes $u=\alpha^r$ mod p. From eq (1) it follows that:

$$S_i \cdot u + r \cdot v \equiv m \bmod p-1 \quad (2)$$

Hence i, who is the only one who knows $S_i$, can compute v, provided $\gcd(r,p-1)=1$. The El Gamal signature scheme is disclosed in T. El Gamal "A Public Key Cryptosystem and a Signature Scheme Based on Discrete Logarithms", IEEE Trans IT, Vol. IT-31, No. 4, July, 1985, pp. 469–472.

The El-Gamal signature system has the curious property that if the signer i tries to use the same r twice to sign two different messages, then these two signatures expose his secret key $S_i$. To see how double use of r exposes $S_i$, note that from eq (2) that $$S_i \cdot u + r \cdot v_1 \equiv m_1 \bmod p-1; \quad S_i \cdot u + r \cdot v_2 \equiv m_2 \bmod p-1 \quad (3)$$

Hence, $$r(v_1 - v_2) \equiv (m_1 - m_2) \bmod p-1 \quad (4)$$

If gcd $(v_1-v_2, p-1)=1$, anybody knowing the messages $m_1$, $m_2$ and their signatures $(u,v_1)$, $(u,v_2)$ can find r, and if $\gcd(v,p-1)=1$, then $S_i$ can be computed. This unique property of the El Gamal signature scheme is used as the basis for an e-cash system according to the invention in which the identity of a double spender of a particular e-coin is exposed.

Other signature schemes such as NIST-DSS and Schnorr also have the property that if two distinct messages are signed using the same random element (e.g. r), then the secret key of the signer can be computed by anyone having the messages, the signatures and public information such as the public key of the signer. As used herein, the term El Gamal family of signatures refers to signature schemes with this property.

C. Blind Signature

The idea of a blind signature is to mimic a situation in which a person signs a closed envelope. The envelope includes some document and a carbon paper, so that the signature appears (via the carbon paper) on the document, without the signer knowing the contents of the document. The recipient can later fetch the signed document from the envelope. This seemingly bizarre idea proves very helpful in establishing nontraceability. A blind signature may be implemented using RSA as follows. The signer is associated with N,e,d (public modulus, public exponent, and secret exponent, respectively). The secret message to be signed is m. The recipient picks a random $x \in Z_N^*$, and presents a "message-in-envelope" $c \equiv x^e \cdot m$ mod N to the signer, who signs it, i.e. computes $c^d \equiv x \cdot m^d$ mod N, from which the recipient, and only the recipient (who knows x), can compute the signed message $m^d \equiv c^d x^{-1}$ mod N.

The public key cryptography techniques described above are used to provide a unique e-cash system according to the invention.

SUMMARY OF THE INVENTION

In accordance with an illustrative embodiment of the present invention, an e-cash system has four players. These are a certification authority, a bank, a payer also known as user i, and a payee also known as user j. There are six basic operations which may be carried out in the e-money system. These are: Initial certificate, refresh certificate, withdrawal, payment, deposit and exchange. The elements of the e-money system of the present invention and the operations are described below.

A. Public Key and Secret Key

A user i has a public key $P_i$, where for example, $P_i = \alpha^{S_i}$ mod p, where $\alpha$ and p are universally known. $S_i$ is a secret key of the user i. The secret key $S_i$ includes the identity $I_i$ of the user i. Illustratively, $S_i$ is a concatenation of the user's name $I_i$ and a string of random bits $R_i$ known only to the user i, i.e., $S_i = (I_i, R_i)$. Alternatively, the secret exponent key $S_i$ may include multiple copies of $I_i$. It should be noted that $P_i$ and $S_i$ are, for example, El Gamal public and secret keys, respectively. As is shown below, this feature is important for detecting the identity of a double spender of a particular e-coin. Alternatively, $P_i$ and $S_i$ may be keys from a different signature scheme in the El Gamal family of signature schemes. NIST DSS and Schnorr are included in the El Gamal family. However, it is desirable for $S_i$ to contain the user's identity $I_i$.

B. Certification of the Public Key

The user may also have a certificate of the public key $P_i$. A certificate of a public key is a linkage between a user's identity $I_i$ and the user's claimed public key $P_i$. In the present invention, this certificate is a proof that the public key $P_i$ is legitimate and that the user's identity is embedded in the exponent or otherwise embedded in the public key. The certificate proves an implicit linkage between the user's name and certificate. The certificate is, for example, a signature (e.g. an RSA signature) of a trusted authority on $f(P_i, 0^\gamma)$, where $0^\gamma$ denotes a run of $\gamma$ zeros. The use of the function f is entirely optional. Thus, in some embodiments of the invention $f(P_i,0^\gamma)=(P_i,0^\gamma)$. In other embodiments of the invention, f is a publicly known collision free hash function. Specifically, let $1(p)=\log_2(p)_{+\gamma}$.

Let $\Sigma=\{0,1\}^{1(p)}$ and $f: \Sigma \to \Sigma$ be a publicly known collision free one way hash function. (Sometimes f is used for $\Sigma=\{0,1\}^{1(p^2)}$ and this is clear from the context.) The certificate of $P_i$ is illustratively computed "off—off line".

As used herein the term "off—off line" designates operations which are performed rarely. Specifically, the term "off—off line" designates operations which may be performed once and whose results are used in many real time operations. The "off—off line" operations are to be contrasted with "off-line" operations which are used in on/off line digital signature schemes. In an on/off line digital signature scheme, for each real time digital signature to be performed, as much of the computation as possible performed ahead of time to reduce real time computation. The computations performed ahead of time for each real time digital signature are referred to as "off-line" computations. There is a one-to-one correspondence between a set of "off-line" computations and a real time digital signature. In contrast, there is no one-to-one correspondence between "off—off" line computations and a real time operation. Rather, the results of an "off—off line" computation can be used in many subsequent real time operations. The use of "off—off line" operations is a unique feature of the present invention. It is a significant advantage of the invention, that a certificate of a public key $P_i$ can be computed "off—off line".

The certificate is obtained as follows. A candidate certificate $f(P_i,0^\gamma)$ is blinded by computing $Z \equiv x^{e_c} f(P_i, 0^\gamma)$ mod $N_c$, where x is a random number, $e_c$ is the public RSA exponent key of a trusted certificate authority, and $N_c$ is a public modulus of the certificate authority. The quantity Z is then transmitted from the user i to the certificate authority.

The user i then proves to the certificate authority that $P_i$ has been properly formatted, i.e., that the secret key $S_i$ in the exponent of $P_i$ includes the user identity $I_i$. This proof can be accomplished without revealing $P_i$ to the certificate authority so that the certificate authority cannot correlate $I_i$ and $P_i$ for the user i. If the certificate authority is able to correlate $I_i$ and $P_i$, then the certificate authority will be able to gain knowledge of all the transactions performed by user i using e-cash. In the present invention, the identity of the user is exposed only when a coin is double spent. To prevent such a correlation, the candidate certificate is blinded before it is sent to the certificate authority. One technique which can be used to perform the proof is known as a zero-knowledge proof (see Goldreich, Micali, and Wigderson Proofs that yield nothing, but their validity, or All languages in NP have zero-knowledge proof systems. J. of the ACM, 38: 691–729, 1991 and Goldwasser, Micali, and Rackoff, The knowledge complexity of Interactive proof systems, SIAM J. on Computing, 181, 1989, pp. 186–208. A zero knowledge proof can be used here because all of the predicates used in the proof are NP (Non-deterministic polynomial time). Another proof technique is a "cut-and-choose" technique. The latter technique is discussed in detail below.

Assuming the proof is acceptable to the certificate authority, the certificate authority computes $Z^{d_c}$, where $d_c$ is the secret RSA exponent key of the certificate authority. $Z^{d_c}$ is then transmitted from the certificate authority to the user i, who then computes the certificate $\text{cert}(i)=Z^{d_c}/x \equiv (f(P_i, 0^\gamma))^{d_c}$ mod $N_c$.

In short, the user i gets a certificate from the certificate authority that establishes a linkage between $I_i$ and $P_i$. However, in contrast to ordinary certificates, this linkage is hidden. The user identity $I_i$ is embedded in the discrete log of the public key $P_i$ and is only exposed when there is double spending of a coin. Note that the certificate cert(i) may be periodically refreshed using off—off line computations.

C. Format of e-coin

In general, a coin includes a certified linkage between a public key of a user and a random element. In accordance with an illustrative embodiment of the present invention, a coin of user i is represented by ($P_i$, u, C), and the certified linkage $C \equiv (f(P_i, u, 0^\gamma))^{d_S}$ mod $N_S$, where $u \equiv \alpha^r$ mod p, where r is a random element and is chosen by i and known only to i, where $30<\gamma<50$, where $d_S$ is a bank's RSA secret exponent for coins of a particular denomination, and where $N_S$ is the RSA modulus of the bank. The key $P_i$, the value u, the modulus $N_S$, and the public RSA exponent $e_S$ (corresponding to the secret RSA exponent $d_S$) are known publicly. Each coin of user i has a different value of the random element r and a corresponding different value of u, but the same $P_i$ is used in many coins.

The following on-line (i.e. real time transactions) can be performed using the e-cash of the present invention.

1. Payment

The payer i transmits a coin ($P_i$,u,C), and the certified linkage $C \equiv (f(P_i, u, 0^\gamma))^{d_S}$ mod $N_S$ to the payee j. The payee j verifies the bank's signature by verifying $C^{e_S}$ mod $N_S \equiv f(P_i, u, 0^\gamma)$. If the banks' signature is correct, the payee j challenges the payer i to sign a random message m. The payer i signs m using ($P_i$, u) embedded in the coin using an El Gamal signature or some other signature from the El Gamal family. The payer i computes the El Gamal signature $s=(u,v)$ and transmits the signature to the payee j. The payee j then verifies the El Gamal signature. The payee j now stores the coin.

In short, in the payment operation the payer sends a coin (certified linkage between a public key and a random element) to a payee. The payee verifies the certificate which illustratively is a bank's signature. The payee then challenges the payer to sign a message m using a signature scheme from the El Gamal family and using the public key and random element embedded in the coin. The payee then verifies the signature.

2. Deposit

Suppose the payee j wants to deposit the coin ($P_i$,u,C) in the bank. The payee j transmits the coin ($P_i$,u,C) and the El Gamal signature $s=(u,v)$ of the payer i to the bank. The message m that was signed by payer i is also transmitted to the bank. The bank verifies the coin by verifying that $$C^{e_S} \text{ mod } N_S \equiv f(P_i, u, 0^\gamma).$$

The bank maintains a list of deposited coins ($p^i$, u, C) and corresponding El Gamal signatures (u,v) and messages m.

The bank then compares the coin currently being deposited with the coins in the list. If there is a duplicate, using equations (2) and (3) above, r and $S_i$ can be determined. From $S_i$, the identity $I_i$ of the double spender is exposed. If there is no duplicate, the coin is added to the list and the balance of the payee j is updated. The list of coins will not grow endlessly if an expiration date is embedded in the coins.

In short, in the deposit operation, the payee transmits the received coin and the payer's El Gamal family signature to the bank. The bank verifies the coin and then compares the coin to a list of previously deposited coins to see if the coin was deposited in the past. If the coin was deposited in the past, the bank is able to determine the identity of the double spender. Specifically, the bank would have received two El Gamal family signatures on two different messages but using the same random element.

D. Exchange of Old Money for New

Instead of the payee j simply depositing the coin received from the payer i, the payee j can deposit the coin at the bank and ask for new coins of the same total value in return. The deposit routine as described above is performed and a verification is made for double spending but no change is made to j's balance. The payee j transmits to the bank a non-blinded certificate $(P_j, 0^{\gamma dc}$ mod $N_c$. The bank then verifies the certificate. For each requested coin, the payee also sends to the bank $u'=\alpha^r$ mod p of his choice. The user j gets back from the bank the certified linkage $C' \equiv (f(P_j, u, 0^\gamma))^{dS}$ mod $N_S$. This is done by an anonymous call by the user who does not identify himself to the bank. The exchange transaction is a feature of the present invention which is not found in prior art e-money systems.

In short, in the exchange operation, a payee deposits old coins in the bank and gets fresh coins in the same total value from the bank. The payee does not reveal his/her identity to the bank and hence the linkage (user, coin) is not known to the bank.

Withdrawal

Another operation which can be performed is a withdrawal operation in which the user withdraws a coin of a particular value from the bank. According to this operation, the user i establishes communication with the bank and authenticates himself/herself with the bank. The user i transmits to the bank a candidate blinded linkage $w \equiv x^{eS} f(P_i, u, 0^\gamma)$ mod $N_S$ on which it is desired to obtain the banks RSA signature. The user also proves to the bank (using a zero knowledge proof, or cut-and-choose proof, for example) that $P_i$ is properly structured without revealing the key $P_i$ to the bank so that the bank cannot correlate the user i with $P_i$. The bank deducts the value of the coin from the user's balance. The bank then returns $w^{dS}$ mod $N_S$, from which the user can formulate the desired coin $(P_i, u, C)$, where the certified linkage $C = f((P_i, u, 0^\gamma))^{dS}$ mod $N_S$. It is expected that the exchange operation will be used more frequently than the more complex withdrawal operation.

In short, in the withdrawal operation, a blinded linkage between a public key (e.g. Pi) and a random element (e.g. u) is transmitted to the bank. Blinding is used so that the bank does not correlate $P_i$ and $I_i$. The bank verifies that $P_i$ is properly structured (i.e. the user's identity $I_i$ is embedded therein). The bank then signs the blinded linkage and returns the signed blinded linkage to the user who then formulates a coin.

The inventive e-cash system disclosed above has a number of significant advantages. The system is simple from the computation and communication point of view. The number of real time operations is limited and the most complex operations are performed off—off line. The inventive e-cash scheme protects the privacy of the user while permitting exposure of the identity of a double spender.

BRIEF DESCRIPTION OF THE DRAWING

FIG. 2 schematically illustrates a payment operation using e-cash in accordance with the present invention.

FIG. 3 schematically illustrates a deposit operation using the e-cash system of the present invention.

FIG. 4 schematically illustrates an exchange operation using the e-cash system of the present operation.

FIG. 5 schematically illustrates a withdrawal operation using the e-cash system of the present invention.

FIG. 6 schematically illustrates an operation for generating an initial certificate of a public key of a user in accordance with the invention.

FIG. 7 schematically illustrates an operation for refreshing a certificate of a public key in accordance with the invention.

FIG. 8 and FIG. 9 illustrate a cut-and-choose technique used to prove the $P_i$ is properly structured in the initial certificate and refresh certificate operations of the present invention.

DETAILED DESCRIPTION OF THE INVENTION

A. The Network Environment

Figure 1:
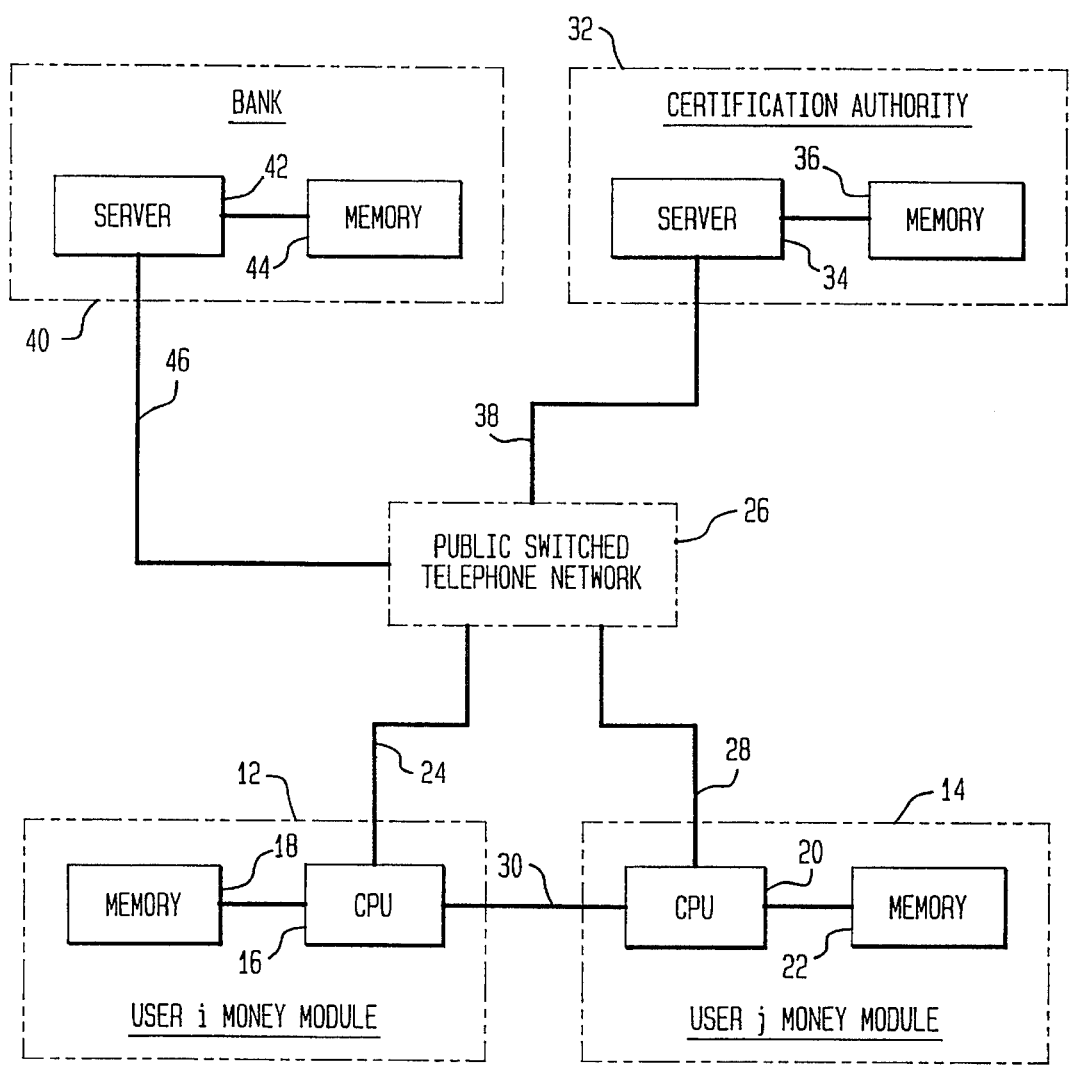
FIG. 1 schematically illustrates a network in which the e-cash scheme of the present invention may be utilized.

FIG. 1 schematically illustrates a network 10 in which the e-cash of the present invention may be utilized to perform a variety of transactions. The network 10 includes a plurality electronic e-coin processing units such as money modules belonging to users, one or more banks, and a certificate authority.

Illustratively, the network 10 of FIG. 1 includes a first portable money module 12 belonging to the user i and a second portable money module 14 belonging to the user j. The money module 12 includes a CPU (e.g., a microprocessor) 16 and a memory 18. The money module 14 includes a CPU 20 and a memory 22. The money module 12 may be temporarily connected via a line 24 to the public switched telephone network 26. The money module 14 may also be temporarily connected via a line 28 to the public switched telephone network 26. Conventional modems (not shown) connect the money modules 12,14 to the lines 24,28. Alternatively, the money modules may be connected to the public switched telephone network via wireless radio channels. Illustratively, the public switched telephone network 26 is an ISDN (Integrated Service Digital Network). The money modules 12 and 14 can communicate with each other via the public switched telephone network 26.

Alternatively, a wireless connection 30 can be established between the money modules 12 and 14. The wireless connection 30 may be established in a cellular network or rely on a direct radio link through the atmosphere between the two money modules. A wireless infrared link may also be established between the two money modules.

It should be noted that the CPU's 16 and 20 of the money module 12 and 14 have limited processing power. In addition, the memories 18 and 22 of the money modules 12 and 14 have limited capacity. Thus, it is desirable for the e-cash transactions of the present invention to require only limited numbers of real time operations at the money modules.

The network 10 also includes a certificate authority station 32. The certificate authority station 32 includes a server 34 and a memory 36. The server 34 is connected to the telephone network 36 by the link 38.

The network 10 also includes a bank station 40. The bank station comprises a server 42 and a memory 44. The server 42 is connected by the link 46 to the telephone network 26.

The network 10 of FIG. 1 is illustrative only. While only two money modules 12 and 14 belonging to users i and j are shown, a network for using e-cash may include a large number of such money modules. In addition, there may be more than one bank.

B. Money Format

As indicated above, each user i has a public key $P_i \equiv \alpha^{Si}$ mod p where $\alpha$ and p are universally known and $S_i$ is a secret key. The secret key $S_i$ includes the identity $I_i$ of user i.

Illustratively, $S_i=(I_i, R_i)$, where $R_i$ is a random string of bits known only to the user i. In addition, the user i has a certificate cert(i) which certifies that $P_i$ has the identity $I_i$ contained within the exponent $S_i$. This format is important for the exposure of a double spender of a particular e-coin. Illustratively, the certificate cert(i) is the signature of a certificate authority on $f(P_i, 0^\gamma)$, where $0^\gamma$ denotes a run of $\gamma$ zeroes and $30<\gamma<50$. For example, cert(i)$\equiv(f(P_i,0^\gamma))^{dc}$ mod $N_c$, where $d_c$ is the secret RSA exponent of the certificate authority and $N_c$ is the modulus of the certificate authority. A detailed process for obtaining the certification is described below in connection with FIG. 6.

A coin of user i has the form $(P_i,u,C)$ where the certified linkage $C\equiv(f(P_i,u,0^\gamma)^{dS})$ mod$N_S$, where $u\equiv\alpha^r$ mod p and, r is a random element chosen by i separately for each coin and known only to i. The exponent $d_S$ is a secret RSA exponent of a bank for a particular coin denomination, and $N_S$ is the bank modulus. The bank also has a public RSA exponent $e_S$ such that $(m^{dS})^{eS}$ mod $N_S\equiv m$, for all m.

C. Payment Transaction

One transaction which can be performed using the e-cash of the present invention is a payment transaction. The payment transaction involves communication between the money module 12 belonging to a payer i and a money module 14 belonging to the payee j. These communications take place via the telephone network 26 or the wireless link 30. The computations required in the payment transaction are performed in the CPU's 18 and 20 of the money modules 12, 14.

The payment operation is illustrated in FIG. 2 and comprises the following steps:

1. The payer i transmits a coin $(P_i,u,C)$ where the certified linkage $C\equiv(f(P_i,u, 0^\gamma))^{dS}$ mod$N_S$ to the payee j.
2. The payee j verifies the coin by verifying the banks RSA signature, i.e., by verifying that $C^{eS}$ mod $N_S\equiv f(P_i, u, 0^\gamma)$. If the verification fails, the payment operation is aborted.
3. If the verification is successful, the payee j picks a random message m.
4. The random message m is transmitted from the payee j to the payer i.
5. The payer i generates an El Gamal signature $s=(u,v)$ on the message m using $P_i$, $S_i$, and u. As indicated, $P_i$ and $S_i$ have the form of El Gamal public and secret keys. (Alternatively, an NIST-DSS or Schnorr signature or other scheme from the El Gamal family may be used).
6. The El Gamal signature s is transmitted from the payer i to the payee j.
7. The payee j verifies the El Gamal signature $s=(u,v)$. If the signature s is not verified positively, the payment operation is aborted. If the signature is verified positively, the payee j stores the coin $(P_i,u,C)$, signature s, and the message m in the memory 22.

It should be noted that the payee j never learns the identity $I_i$ of the payer i because there is no easy way to correlate the public key $P_i$ with the identity $I_i$ if p is large enough. Thus, privacy of the payer i is maintained.

D. Deposit Transaction

FIG. 3 shows a transaction wherein the payee j deposits the coin $(P_i,u,C)$ received from the payer i in the bank 40. To carry out the deposit operation, the money module 14 of the payee j and the bank 40 communicate via the public switched telephone network 26. The steps in the deposit transaction are as follows:

1. The payee j transmits the coin $(P_i, u, C)$ and the El Gamal signature s received from the payer i, as well as the message m, to the bank 40.
2. The bank verifies the coin by verifying that $C^{eS}$ mod $N_S$ $\equiv f(P_i, u, 0^\gamma)$.
3. The bank maintains a list of deposited coins. For each coin, the list includes a message and an El Gamal signature obtained on the message using the El Gamal key and value of u inside the coin. This list is stored in the memory 44. (An expiration date may be added to the coins to limit the size of this list).
4. Using the server 42, the bank 40 compares the coin $(P_i,u,C)$ to the list of already deposited coins stored in the memory 44. If a collision is found, double spending is detected. Then the identity $I_i$ of the payer i is determined. The identity can be determined because two El Gamal signatures on different messages but using the same $P_i$ and u result in exposure of the secret key $S_i$. Because $S_i$ contains $I_i$, then $I_i$ is also exposed. This was proven in connection with equations (2) and (3) above. If the coin C is not found in the list, the payer's signature s is verified. Then the coin $(P_i,u,C)$ and associated El Gamal signature s and message m are added to the list maintained at the bank.
5. The payee j has its balance updated by the bank.

It should be noted that the deposit operation does not reveal the identity $I_i$ of the payer i unless the payer is a double spender.

E. Exchange Transaction

Another transaction which can be performed using the e-cash of the present invention is an exchange transaction. The exchange transaction involves a user depositing old e-coins with the bank and withdrawing new e-coins in the same total amount. The purpose of the exchange operation is to refresh the used cash of a user. A coin is used only once, hence when a user gets a coin as a payee he must exchange it for a new coin before he can use it as a payer. Illustratively, the exchange transaction is performed by communication between the money module 14 of the user j and the bank 40 using the public switched telephone network 26. As shown in FIG. 4, the steps involved in the exchange operation are as follows:

1) The user makes an anonymous call to the bank.
2) The payee j sends to the bank the used coin $(P_i,u,C)$, where the certified linkage $C\equiv(f(P_i, u,0^\gamma))^{dS}$ mod $N_S$, received from payer i and the El Gamal signature s received from payer i along with the message m.
3) The bank verifies the coin by verifying $C^{eS}$ mod $N_S$ $\equiv f(P_i, u,0^\gamma)$.
4) The bank compares the coin $(P_i,u,C)$ to a list of already deposited coins stored in the memory 44. If a collision is found, double spending is detected. Then the identity of the double spender is determined in the same manner as for the deposit transaction discussed above. If the coin C is not found in the list, the payer's signatures s is verified and the coin C is added to the list maintained by the bank.
5) A certificate, cert(j)$\equiv(f(P_j, 0^\gamma))^{dc}$ mod $N_c$ and $u'\equiv\alpha^{r'}$ mod p are transmitted from the payee j to the bank.
6) The bank verifies the certificate and forms a new certified linkage $C'\equiv(f(P_j, u', 0^\gamma))^{dS}$ mod $N_S$ which is transmitted to the user j, who then formats a new coin $(P_j,u',C')$.

Note: For this operation the bank never learns the identity of the payer i or the payee j. Nor can the bank associate the coin $(P_j,u',C')$ with any particular user as the coin $(P_j, u', C')$ circulates. The reason for this is that the bank has no way to correlate $P_i$ or $P_j$ with $I_i$ or $I_j$ and because the call is anonymous.

The above described three transactions—payment, deposit, exchange—are all performed in real time and require a minimum amount of operations at the money modules.

F. Withdrawal Transaction

Another transaction which can be performed using the e-money of the present invention is withdrawal from the bank. Illustratively, the user i uses the money module 12 to communicate with the bank 40 via the telephone network 26 to perform the withdrawal operation. The steps in the withdrawal operation are shown in FIG. 5 and described below.

1) The user i transmits its identification $I_i$, an account number and a value to be withdrawn to the bank.
2) The bank verifies the identification $I_i$ and checks the account balance.
3) The user i picks a random x and forms a blinded candidate linkage $W = x^{e\$} f(P_i, u, 0^\gamma) \mod N_S$ and transmits the blinded candidate linkage to the bank.
4) The user i proves to the bank that $P_i \equiv \alpha^{S_i} \mod p$ is properly formatted and that $S_i$ includes $I_i$. This is done using a zero knowledge proof, or a cut-and-choose technique, for example, so that the bank does not learn $P_i$. Thus, the bank cannot correlate $P_i$ and the identity of i. Therefore, the privacy of user i is preserved.
5) If the bank rejects the proof, the operation is halted. Otherwise the bank forms $W^{d\$} \equiv x(f(P_i, u, 0^\gamma))^{d\$} \mod N_S$ and transmits this quantity to the user.
6) The user then forms the coin $(P_i, u, C)$ using the linkage $\equiv W^{d\$}/x \equiv (f(P_i, u, 0^\gamma))^{d\$} \mod N_S$ It should be noted that the withdrawal operation is more complex than the exchange operation because the user i must prove that $P_i$ as incorporated in the blinded candidate linkage is properly formatted without revealing $P_i$. It is expected that the withdrawal operation may be avoided most of the time. The reason that the withdrawal operation can be avoided is that e-coins can be traded for traceable e-money such as e-checks and then the exchange operation can be utilized.

G. Certification Operation

As indicated above, the e-money system of the present invention makes use of a certification of the key $P_i$. The certification is carried out off—off line by the certificate authority. The money module of a user i communicates with the certificate authority 32 via the telephone network 26. The steps in the certification process of $P_i$ are illustrated in FIG. 6 and are as follows:

1. The user picks a random x and forms the blinded candidate certificate $Z \equiv x^{ec} f(P_i, 0^\gamma) \mod N_c$. The blinded candidate certificate Z is then transmitted to the certificate authority along with an identifying $I_i$.
2. The user, then proves to the certificate authority that $P_i$ is formatted correctly using for example a zero knowledge proof or cut-and-choose technique so that the certificate authority does not learn $P_i$ and therefore cannot correlate $P_i$ and $I_i$.
3. If the proof is rejected, the certificate operation is halted. Otherwise, the certificate authority computes $Z^{dc}$ and transmits $Z^{dc}$ to the user i.
4. The user i then computes cert $(i) \equiv Z^{dc}/x \equiv (f(P_i, 0^\gamma))^{dc} \mod N_c$.

Using this certification process, the certificate authority does not learn $P_i$ and, therefore, cannot correlate $P_i$ and $I_i$. This prevents the certificate authority from learning about the e-cash transactions performed by the user i, thereby protecting the privacy of the user i.

H. Refresh Operation

Because it is possible that the correspondence between $P_i$ and $I_i$ will leak out (e.g. by means external to cryptography), it is desirable to refresh the $P_i$ and cert(i) periodically. The refresh operation is illustrated in FIG. 7 and the steps may be described as follows:

1) The user picks a random x.
2) The user selects a new key $P_i' \equiv \mod p$, $S_i' = (I_i, R_i')$, where $R_i'$ is a fresh string of random bits selected by the user i. Using the key $P_i'$, a new candidate certificate $f(P_i', 0^\gamma)$ is selected. The new candidate certificate is blinded by computing $Y \equiv x^{ec} f(P_i', 0^\gamma)$. Y and the old certificate cert(i) are transmitted to the certificate authority.
3) The user i proves to the certificate authority that $P_i$ and $P_i'$ contain the same $I_i$, using for an example, a zero knowledge proof or cut and choose technique so that the certificate authority cannot correlate $P_i$ or $P_i'$ with $I_i$.
4) If the certificate authority rejects the proof the operation is halted. Otherwise the certificate authority computes $(Y)^{dc}$ and transmits this value to the user i.
5) The user i then computes a new certificate $\text{cert}_2(i) \equiv (Y)^{dc}/x \equiv (f(P_i', 0^\gamma))^{dc} \mod N_S$.

I. Cut and Choose Technique for Proving $P_i$ has the Correct Structure

An illustrative technique for proving the $P_i$ has the proper structure is now discussed. This technique is known as a cut-and-choose technique (see e.g. D. Chaum, A. Fiat, M. Naor Untracable Electronic Cash. Proc. Crypto 1988; M. O. Rabin, Digitalized Signatures in Foundations of Secure Computation, Academic Press, No.1., 1978).

This technique involves the use of more than one copy of the user identification (I.D.). $I_i$ in the exponent of the public key $P_i$. The exponent has k+2 fields. The k left most of these fields are of a size $\gamma = \log 2Y(I_i)$ bits. These k fields are known as I-fields. Normally, (i.e., if nobody cheats) each field holds the correct I.D. When the exponent of a double spender of a coin is computed, if there was cheating in the initial certificate, and the exponent contains a few distinct candidate identifications, then it may happen that more than one of them needs to be examined (e.g., up to k, k=40, is needed for a one in a million fraud success probability).

Various policies are possible regarding a mixed exponent. One example of a policy for handling a mixed exponent is the following: On double spending, incriminate the user whose ID appears a majority of time in the exposed exponent. This policy implies that the best strategy for a cheater is to try to consistently incriminate some other real user (say j, whose indentificatoin is $I_j$) by placing the other user's ID in at least k/2 of the I-fields. In this case, the cheating success probability is $O(2^{-k/2})$.

The following notation is used in the description cut-and-choose technique for verifying that $P_i$ is properly structured. As before, variables with subscripts \$, c are associated with Bank and Certification Authority respectively. Let $I_i$ denote user i's unique ID. All ID's are of size v bits, and all random variables $R_{ij}$ are of size $\rho$ bits, and are drawn with uniform distribution over $\{0,1\}^\rho$.

Let $$z_{ij} = 2^{v(j-1)} \cdot I_i, \quad s_{ij}^{(q)} = z_{ij} \cdot 2^{\rho+k} + R_{ij}^{(q)}, \quad q \in \{0,1\}; j = 1, 2 \ldots k,$$

(here (q) is another index, not exponent), i.e.

$$S_{ij}^{(q)} = \left( 0, \overset{j\text{'th I-field}}{\underset{0}{\frac{v}{0}}} \ldots, I_i, 0, \ldots 0, 0^k, R_{ij}^{(q)} \right)$$
$k$ I-fields $P_{ij} \equiv \alpha^{s_{ij}} \mod p$, $\sigma = \log_2(s_{ij}) \geq (1+v) \cdot k + \rho$, $\log_2 p > \sigma$. All random variables $x_{ij}$ are of size $\log_2 N$ (whichever N is relevant, i.e. $N_c$ in Initial-certificate and Refresh-certificate, and $N_S$ in Withdrawal-from-account, and Exchange), and are drawn with uniform distribution over $\{0,1\}^{\log_2 N}$. L denotes the run of $\gamma$ zeroes.

The cut-and-choose technique is used for Initial certificate, Withdrawal and Exchange and Refresh Certificate.

"Cut and Choose" Initial Certificate

The use of the cut-and-choose technique to obtain the Initial certificate is illustrated in FIG. 8. The technique is divided into two phases, phase I and phase II.

Phase I

1. User i authenticates herself to Certificate Authority (CA), and presents k blinded pairs $$(B_{ij}^{(0)}, B_{ij}^{(1)}),$$

where $B_{ij}^{(q)} \equiv (x_{ij}^{(q)})^{ec} \cdot f(P_{ij}^{(q)}, L) \mod N_c, q = 0, 1; j = 1, 2, \ldots k.$ (FIG. 8, step 1 and step 2.)

2. CA picks with uniform distribution a binary vector of length k (denoted subsequently in short as $e \in_R \{0,1\}^k$), and sends it to user i. Let $e = (e_1 \ldots e_k)$. (FIG. 8, Step 3).

3. For $j = 1 \ldots, k$, user i transmits $x_{ij}^{(ej)}, R_{ij}^{(ej)},$ to the Certificate Authority (CA) which verifies consistency with $B_{ij}^{(ej)}$ as indicated in step 4 and step 5 of FIG. 8 (this is total exposure and total verification).

4. CA computes $$B_i \equiv \prod_{j=1}^{k} B_{ij}^{(\bar{ej})} \mod N_c$$

($\bar{e}_j$ means the binary complement of $e_j$) then signs its, i.e., computes $C_i \equiv B_i^{d_c c} \mod N_c,$ and transmits Ci to user i. (step 6 and 7 of FIG. 8)

5. User i un-blinds $C_i$ to produce $$D_i \equiv C_i \cdot \left( \prod_{j=1}^{k} x_{ij} \right)^{-1} \mod N_c$$

$D_i$ is not revealed to CA at this point. (step 8 of FIG. 8)

Phase II

It should be noted that phase II takes place at an uncorrelated time after the completion of phase I.

1. User i makes anonymous call to CA, and presents $D_i$, and the corresponding $P_{ij}^{(\bar{ej})}.$ CA verifies his signature on $D_i$, and consistency of the given components (partial structure verification). (FIG. i, steps 9, 10, 11)

2. For each $P_{ij}^{(\bar{ej})},$ user i proves to CA that all the i-fields, except the j'th, are zeroes, using gradual verifiable unordered release of zeroes of Dicrete Log (DL) (This is discussed below.) (FIG. 8, step 12.)

3. CA computes $$E_i \equiv \left[ f\left( \left( \prod_{j=1}^{k} P_{ij}^{(\bar{ej})} \mod p \right), L \right) \right]^{d_c} \mod N_c.$$

This is i's initial certificate. It is known to CA, however the linkage between this certificate and i is not known.

Analysis

If i was honest then the exponent of $$P_i \equiv \prod_{j=1}^{k} P_{ij}^{(\bar{ej})} \mod p$$

contains k copies of $I_i$.

Step 2, of phase II guarantees that with probability $1 - 2^{-n}$ the DL of each component used in the construction of the certificate is structured correctly, with respect to the nullified fields. The only other way that user i can cheat is to use false ID's (in the right places). The probability of each component not to be caught is ½ (step (3) of Phase I). Hence the probability that no $S_{ij}$ is correct is $O(2-k)$. Similarly, the probability to have $\lceil k/2 \rceil$ corrupt entries (the best cheating strategy is to introduce $\lceil k/2 \rceil + 1$ consistent wrong entries, $\tilde{I}_i$, thus incriminating some user with that ID) without getting caught is $O(2^{-k/2})$. This is also the total cheating probability for $n = k$.

Withdrawal from Account

This is done like in Initial-certificate, where the bank plays the role of CA, and in phase II the user presents to the bank, in addition, an element $u \equiv \alpha^r \mod p$, for which the user knows r. The user gets from the bank a blinded coin $x \cdot (f(P_i, u, L))^{d_S} \mod N_S$, where $\log_2(N_S) = l(p^2)$, and she un-blinds it.

Refresh Certificate

The main idea is to prove that the old and new components of the certificate have the same ID, $I_i$, in the exponents by dividing them. If the claim is true then those IDs cancel out. This does not explicitly reveal their values. The result is a shorter exponent. This fact is proved using a technique described below. The primed and unprimed variable denote old and new certificates (and the other corresponding variables), respectively. The refresh certificate is obtained using the following steps:

1. User i makes anonymous call to CA, and presents an old certificate $E_i'$, and its components, $P_{ij}'$, $1 \leq j \leq k$, and CA verifies them (structure and signature). These are partial exposure and verification. (FIG. 9, steps 1 and 2.)

2. User i presents to the bank k pair candidates $$B_{ij}^{(q)},$$

$q=0,1$; $1 \leq j \leq k$, for a new certificate. (FIG. 9, step 3.)

3. CA picks with homogeneous distribution $e \in_R \{0,1\}_k$, and sends to user i.

4. For $j=1 \ldots k$, user i sends $$P_{ij}^{(ej)}, x_{ij}^{(ej)}$$

(but, unlike in Initial-certificate, not $$R_{ij}^{(ej)}),$$

and CA verifies structure consistency (partial exposure and verification). (FIG. 9, step 3.)

5. Let $$P_i^{(e)} \equiv \Pi_{j=1}^{k} P_{ij}^{(ej)} \bmod p, \text{ and } P_i' \equiv \Pi_{j=1}^{k} P_{ij}' \bmod p.$$

Both CA and user i compute $$P_i'/P_i^{(e)} \bmod p,$$

and user i proves to CA that this is congruent modulo p to $\alpha^\delta$, where $\delta$ is short (i.e., $\log_2 \delta = p+k$). This is done using the technique described below, without revealing the actual exponents (i.e., the p+k least significant bits of the exponent remain secret). (FIG. 9, steps 7 and 8.)

6. If the check passes positively for all pairs in step (5) CA proceeds as in Initial-certificate (phase I, step 4, etc.). Now $E_i$ is the refreshed certificate.

If a user is caught cheating even once on "Refresh", his old certificate is revoked. It is true that if an old certificate contains undetected false I-fields, then a user can replicate them in the new 2xk matrix of candidate components $$B_{ij}^{(q)}$$

(contaminate the corresponding column likewise). This implies that with probability ½ a cheater can successfully sneak in a new contamination. However, the cheater must successfully sneak in k/2 consistent false entries, and this may happen (even if the cheater does it one at a time, but consecutively) with probability of only $O(2^{-k})$.

To sum up, cheating probability is $O(2^{-k}+2^{-n})$. The first component comes from the cut and choose portion of phase-I (like in "Initial certificate"), and the second component comes from the technique for proving certain fields of a discrete-log discussed below. So, for k=n (a reasonable choice) we get cheating probability $O(2^{-k})$.

Efficient Method for Proving the Value of Certain Fields of a Discrete-log without Exposing the Rest A prior art technique for solving this problem is disclosed E. F. Brickell et al. "Gradual and Verifiable Release of a Secret" Proc. Crypto 87. While in [2] bits are released in order most significant first, we can release any segment. In our method, as well as in that of the reference the release is not total. In the inventive method there is a residual uncertainty of 1 bit, and similarly in the reference, if the DL is in the interval [a, a+B), then the prover can prove that it is in [a–B,a+2B].

There is first explained a simplified version that releases only zero segments (which is all that is needed for the e-money system of the present invention), and then generalize to release any value.

The technique is as follows:

Given $P_{ij} \equiv \alpha^{S_{ij}} \bmod p$, the goal is to prove that $S_{ij}$ has the above structure, without exposing it.

The goal is accomplished by repeating the following process n times:

1. Prover picks random $\beta_1$ and $\beta_2$ of sizes $\log_2 \beta_1 = v$, and $\log_2 \beta = p$, and creates a vector v of the same structure as $S_{ij}$, namely, $v=(0,0 \ldots \beta_1,0, \ldots 0,0^k,\beta_2)$, where $\beta_1$ occupies the $j_{th}$ I-field. The prover then computes $\alpha^v \bmod p$ and sends it to the verifier.

2. The verifier challenges the prover at random to either
   (a) Expose v, or
   (b) Expose $S_{ij}+v$ (ordinary addition, when the two components are viewed as integers).

3. The prover responds to the challenges accordingly, and the verifier checks that
   (a) v is of the right structure, and is consistent with the committed $\alpha^v \bmod p$, or,
   (b) $S_{ij}+v$ is of the right structure (has zeroes where expected, with at most one bit overflow allowed from each non-zero field), and that $\alpha^{S_{ij}+v} \equiv P_{ij} \cdot \alpha^v \bmod p$, respectively.

The prover is committed to v and $S_{ij}$, hence if the prover can respond to the two challenges correctly then $S_{ij}$ is of the right structure, With probability ½, v is of the right structure (when asking to expose $S_{ij}+v$), and the verifier sees that $S_{ij}+v$ looks rights, hence so does $S_{ij}$. Repeating the above n times, and aborting if even in one case the response is incorrect, will reduce error probability to $O(2^{-n})$.

To release any value, x, of a segment, proceed with v as before (i.e. v has zeroes in that segment). The verifier checks that v indeed has zeroes there, or that $s_{ij}+v$ has value x there, with one bit overflow allowed. So, this method reduces the entropy of a segment of length η bits exponentially fast from η bits to 1 (bit).

Conclusion

In short, a unique electronic cash system has been disclosed. The electronic cash system of the present invention protects the privacy of users in legitimate transactions, while at the same time permitting the identity of a double spender of a particular electronic coin to be revealed. These highly beneficial results are achieved through the use of the El Gamal signature scheme and other public key cryptographic techniques.

It should be noted that while certain operations utilized in connection with the invention have been described herein through use of the RSA public key cryptographic technique, other public key cryptographic techniques such as Rabin modular square roots may be used in place of RSA.

Finally, the above described embodiments of the invention are intended to be illustrative only. Numerous alternative embodiments may be devised by those skilled in the art without departing from the spirit and scope of the following claims.

I claim:

1. A method for performing an electronic cash transaction comprising the step of transmitting via a communications link from a first electronic coin processing unit to a second electronic coin processing unit an electronic coin comprising a linkage of a public key of a party and a random element, said linkage being signed using a secret operation of a public key cryptographic system, wherein said public key has the form $$P_i = \alpha^{S_i} \bmod p$$

where $P_i$ is a public El Gamal Key of a party i, $S_i$ is a secret El Gamal Key of the party i which includes an identity $I_i$ of the party i, and p and $\alpha$ are publicly known numbers, and wherein said random element has the form $u \equiv \alpha^r \bmod p$, where r is a random number chosen by the party i.

2. The method of claim 1 wherein said linkage is signed using an RSA secret exponent of a bank.

3. The method of claim 1 wherein said transmitting step comprises transmitting said electronic coin via a wireless link.

4. The method of claim 1 wherein said transmitting step comprises transmitting said electronic coin via a public switched telephone network.

5. The method of claim 1 wherein said first electronic coin processing unit is a first money module belonging to a first party i.

6. The method of claim 5 wherein said first money module comprises a central processing unit and a memory.

7. The method of claim 5 wherein said second electronic coin processing unit is a second money module belonging to a second party j.

8. The method of claim 7 wherein said transaction comprises transmitting said coin from said first money module of said first party i to said second money module of said second party j.

9. The method of claims 8 further comprising the steps of
   a) transmitting a message m from the party j to the party i,
   b) signing the message m at the party i with a signature from the El Gamal family,
   c) transmitting the signature to the party j, and
   d) verifying the signature at the party j.

10. The method of claim 7 wherein said second money module comprises a central processing unit and a memory.

11. The method of claim 1 wherein said first electronic coin processing unit is a money module belonging to a party j and said second electronic coin processing unit is a bank.

12. The method of claim 11 wherein said transmitting step comprises transmitting said electronic coin from said party j to said bank.

13. The method of claim 12 wherein said the public key in said electronic coin transmitted from said party j to said bank is the public key of a party i who transferred the coin to the party j.

14. The method of claim 13 further comprising the steps of transmitting from said party j to said bank an El Gamal family signature of the party i on a message m and said message m.

15. The method of claim 14 further comprising the steps of
   a) maintaining in a memory at said bank a list of coins and corresponding El Gamal family signatures,
   b) comparing said coin transmitted to said bank from said party j with the coins in said list,
   c) if there is a collision between said coin, transmitted from said party j and a coin on said list, utilizing the El Gamal family signature transmitted from the party j and the El Gamal family signature of the coin in the list to identify a double spender.

16. The method of claim 15 further comprising the steps of
   d) transmitting to said bank from the party j a certificate of a public key of the party j, and
   e) transmitting from the bank to the party j a new coin equal in value to the coin originally transmitted from the party j to the bank.

17. A method for detecting the double spending of a particular electronic coin in an electronic coin system where each of the coins comprises a certified linkage of a public key of a user and a random element, said method comprising the steps of
   a) storing in a memory a list of coins and El Gamal family signatures on messages obtained using the public keys and random elements in the coins,
   b) using an electronic processor, comparing said particular coin to the coins on the list, and
   c) if said particular coin and a coin on said list match, using a particular El Gamal family signature of said particular coin on a particular message and the El Gamal family signature and message of said coin on said list to identify a double spender.

18. The method of claim 17 wherein said certified linkage is of the form $C \equiv f(P_i, u, 0^\gamma)^{d_S} \bmod N_S$ where $P_i$ is a public key of a user i, u is said random element, $0^\gamma$ is a string of $\gamma$ zeros, $d_S$ is the secret RSA exponent of a bank, $N_S$ is a modulus of the bank.

19. The method of claim 18 wherein said public key $P_i$ is of the form $$P_i \equiv \alpha^{S_i} \bmod p,$$

where Si is a secret key of the user i and includes the identity $I_i$ of the user i, $\alpha$ and p are publicly known numbers and said random element is of the form $u = \alpha^r \bmod p$, where r is a random number chosen by the user i.

20. A method for performing a payment using an electronic coin system comprising the steps of
   a) transmitting an electronic coin from a money module belonging to user i to a money module belonging to user j, said electronic coin comprising a certified linkage of a public key $P_i$ of the user i in which there is embedded the identity $I_i$ of the user i and a random value u chosen by the user i,
   b) transmitting a message m from said money module of said user j to the money module of the user i,
   c) utilizing a processor in the money module of the user i, generating an El Gamal family signature s of the message m using $P_i$ and u,
   d) transmitting the signature s to the money module of the party j, and
   e) verifying said signature s at the money module of the party j and storing the coin at a memory in the money module of the party j.

21. The method of claim 20 wherein said linkage is signed using a secret key of a bank.

22. The method of claim 20 wherein said secret key of said bank is a secret RSA exponent of said bank.

23. The method of claim 21 further comprising the step of at said money module of said party j, verifying said coin using a public key of said bank.

24. The method of claim 23 wherein said public key of said bank is a public RSA exponent.

25. The method of claim 20 wherein $P_i$ is a public El Gamal Key and $S_i$ is a secret El Gamal Key of a party i.

26. The method of claim 20 wherein said certified linkage is of the form $C \equiv f(P_i, u, 0^\gamma)^{d_S} \bmod N_S$ where $P_i$ is said public of said user i,
u is said random element,
$0^\gamma$ is a string of $\gamma$ zeros,
$d_S$ is a secret RSA exponent of a bank,
$N_S$ is a modulus of the bank.

27. The method of claim 26 wherein said public key $P_i$ is of the form $P_i \equiv \alpha^{S_i} \bmod p$, where Si is a secret key of the user i and includes the identity $I_i$ of the user i, $\alpha$ and p are publicly known numbers and said random element is of the form $u = \alpha^r \bmod p$ where r is a randomly chosen number.

28. A method for processing an electronic coin at a bank station containing a processing unit and a memory comprising the steps of:

a) receiving at said bank station a particular electronic coin comprising a certified linkage of a public key $P_i$ of a party i, and a random value u chosen by the party i, b) using said processing unit at said bank station, comparing said particular coin to a list of electronic coins maintained by said bank in said memory, and c) if said coin matches a coin in said list, using a message m and an El Gamal family signature s on the message m obtained using $P_i$ and u of said particular coin, and an El Gamal family signature and corresponding message associated with said coin on said list to identify a double spender.

29. The method of claim 28 wherein said coin is received at said bank from a party j other than said party i.

30. The method of claim 28 further comprising the step of receiving at said bank a certificate containing a different public key and a different random value, forming a new certified linkage of said different public key and different random value, and transmitting the new certified linkage to a particular party.

31. The method of claim 28 wherein said certified linkage is of the form $C \equiv f(P_i, u, 0^\gamma)^{d_S} \bmod N_S$ where $P_i$ is said public of said user i,
u is said random element,
$0^\gamma$ is a string of $\gamma$ zeros,
$d_S$ is a secret RSA exponent of a bank,
$N_S$ is a modulus of the bank.

32. The method of claim 31 wherein said public key $P_i$ is of the form $P_i \equiv \alpha^{S_i} \bmod p$, where Si is a secret key of the user i and includes the identity $I_i$ of the user i, $\alpha$ and p are publicly known numbers and said random element is of the form $u = \alpha^r \bmod p$ where r is a randomly chosen number.

33. A method for electronically withdrawing an electronic coin from a bank comprising the steps of a) using a processor of a user, performing a blinding operation to blind a candidate linkage, which blinded candidate linkage includes a public key of the user and a random element, b) transmitting via a communication link from the user to the bank the identity of the user and the blinded candidate linkage, c) transmitting from the user to the bank an indication to said bank that the public key of the user has an identity of the user embedded therein without revealing the public key of the user to the bank, d) utilizing a processor at said bank, signing said blinded candidate linkage using a secret key of said bank and transmitting the signed blinded candidate linkage to said user, and e) at said user, generating a coin from the signed blinded candidate linkage, wherein said public key is of the form $P_i \equiv \alpha^{S_i} \bmod p$, where Si is a secret key of the user i and includes the identity $I_i$ of the user i, $\alpha$ and p are publicly known numbers and said random element is of the form $u = \alpha^r \bmod p$ where r is a random chosen number.

34. A method for certifying a public key of a user of an electronic cash system comprising the steps of a) utilizing an electronic processor of a user, performing a blinding operation on a candidate certificate to generate a blinded candidate certificate, said blinded candidate certificate including a public key of a user i of the form $P_i \equiv \alpha^{S_i} \bmod p$, where $S_i$ is a secret key of the user i containing an identity $I_i$ of the user i, and $\alpha$ and p are publicly known numbers, b) transmitting via a communication link, said blinded candidate certificate to a certificate authority, c) transmitting via said communication link an indication to said certificate authority that $P_i$ contains $I_i$ without revealing $P_i$ to the certificate authority, d) utilizing a processor at said certificate authority, signing said blinded candidate certificate using a secret key of said certificate authority and transmitting the signed blinded candidate certificate to said user i, and e) at said user i, generating a certificate from said signed blinded candidate certificate.

35. The method of claim 34 wherein said candidate certificate has the form $f(P_i, 0^\gamma)$, 36. A method for refreshing a certificate of a public key of a user in an electronic cash system comprising the steps of:

(a) transmitting from a user i to a certificate authority an old certificate of an old public key $P_i$ that includes an identity Ii of the user i, (b) at the user i, using an electronic processor, selecting a new public key $P_i'$ including the identity $I_i$, and forming a blinded candidate refresh certificate including said new key $P_i'$, (c) transmitting from said user i to said certificate authority said blinded candidate refresh certificate, (d) transmitting to said certificate authority an indication that $P_i'$ contains the same $I_i$ as $P_i$ without revealing $P_i$ to said certificate authority, (e) utilizing an electronic processor at said certificate authority, signing said blinded candidate refresh certificate using a secret key of the certificate authority and transmitting the signed blinded candidate refresh certificate to the user i, and (f) at said user i, generating a refresh certificate from said signed blinded candidate refresh certificate.

37. The method of claim 36 wherein:

Pi is of the form $Pi \equiv \alpha^{Si}$ mod p, where Si is an old secret key that includes an identity Ii of the user i, and Pi' is of the form $Pi \equiv \alpha^{Si'}$ mod p, where Si' is a new secret key including the identity Ii.

38. An electronic coin that can be transmitted via a communications link and stored in an electronic memory and comprising a certified linkage between a public key $P_i$ of a party i and a random element chosen by the party i, the identity $I_i$ of the party i being embedded in the discrete log of the public key and being exposed when there is double spending of the coin.

39. The electronic coin of claim 38 wherein said certified linkage is signed using a secret operation of a public key cryptography system.

40. The electronic coin of claim 39 wherein said certified linkage is signed using an RSA secret exponent.

41. The electronic coin of claim 40 wherein said certified linkage has the form $$C \equiv f(P_i, u, 0^\gamma)^{d_S} \mod N_S$$

where

C indicates a certified linkage $u = \alpha^r$ mod p, where a and p are publically known numbers and r is a random number chosen by the user i, $0^\gamma$ indicates a run of $\gamma$ zeros, and $d_S$ is a secret RSA exponent of a bank.

42. An electronic coin that can be transmitted via a communications link between a first electronic coin processing unit and a second electronic coin processing unit and comprising a certified linkage of a public key $P_i \equiv \alpha^{Si}$ mod p of a user i, where $S_i$ is a secret key of the user i and includes the identity $I_i$ of the user i and $\alpha$ and p are public numbers, and a random element.

43. The electronic coin of claim 42 wherein said random element is a value $u \equiv \alpha^r$ mod p, where r is a random secret integer chosen by a user i for the coin.

44. The electronic coin of claim 42 wherein said certified linkage is signed using a secret operation of a public key cryptographic system.

45. A public key cryptographic method comprising the steps of:

(a) selecting a cryptographic key for a user i, said cryptographic key containing specific predetermined information, (b) at a certificate authority, using an electronic processor, certifying that said cryptographic key contains said specific predetermined information, (c) transmitting via a communication link a certificate of said cryptographic key to said user i, and (d) utilizing said certified public key by said user i in a plurality of real time cryptographic transactions.

46. The method of claim 45 wherein said cryptographic key is a public key $P_i$ of a user i, said specific information is the identity $I_i$ of the user i and said certificate has the form $f(P_i, 0^\gamma)^{dc}$ where $0^\gamma$ is a run of $\gamma$ zeros and dc is a secret RSA exponent of the certificate authority.

47. The method of claim 46 wherein said public key has a form $P_i \equiv \alpha^{Si}$ mod p, where $S_i$ is a secret key of the user i, and where $\alpha$ and p are public numbers.

48. The method of claim 45 wherein said certifying step comprises using said electronic processor to sign a candidate certificate including said public key with a secret key of said certificate authority.

49. The method of claim 45 wherein said real time cryptographic transactions comprise transactions utilizing e-coins incorporating said cryptographic key.

50. An electronic money exchange transaction comprising the steps of (a) transmitting an old electronic coin having a specific monetary value from a user j to a bank via a communications network, said user j having received said electronic coin from another user i, (b) verifying said coin using an electronic processor at said bank, (c) at said bank, using said electronic processor, generating a certified linkage of a public key of said user j and a random element known to said user j and transmitting said certified linkage to said user j via said communications network.

51. The method of claim 50 wherein said certified linkage has the form $$C \equiv f(P_j, u, 0^\gamma)^{d_S} \mod N_S$$

where f is a function $P_j$ is a public key of the user j u is a random element $0^\gamma$ is a run of zeros $d_S$ is a recent RSA exponent of the bank $N_S$ is a modulus of the bank.

* * * * *